March 4, 1969   W. F. VAN OSTRAND   3,431,474
VARIABLE FREQUENCY FINE-COARSE POSITION MOTOR CONTROL
Filed Sept. 3, 1964   Sheet 1 of 3

Fig. 1.

INVENTOR.
William F. Van Ostrand
BY
Hibben, Noyes & Bicknell
Attys.

United States Patent Office 3,431,474
Patented Mar. 4, 1969

3,431,474
VARIABLE FREQUENCY FINE-COARSE POSITION MOTOR CONTROL
William F. Van Ostrand, Hagerstown, Ind., assignor to Dynamic Precision Control Corporation, Hagerstown, Ind., a corporation of Indiana
Filed Sept. 3, 1964, Ser. No. 394,227
U.S. Cl. 318—18  6 Claims
Int. Cl. G05b *11/00,* G01b *11/16, 11/30*

ABSTRACT OF THE DISCLOSURE

This disclosure deals with a multiple channel frequency modulated system for controlling the position of a movable structure. The system includes two fine channels which are alternately switched into controlling relation with the structure, the frequencies of the two fine channels being equal at the switching points to avoid switched transients. An override channel is also provided which is switched into controlling relation with the structure when the structure is more than a predetermined distance from a desired position.

---

A system for controlling the position and movement of a movable structure such as the carriage or crossfeed of a lathe, or the table of a milling machine, is described in copending U.S. application Ser. No. 212,243, entitled "Control System," filed July 25, 1962, in the name of Vern C. Vanderbilt, now Patent No. 3,308,360. The system disclosed in that application comprises coarse and fine channels which include position-to-frequency transducers connectable to the structure for respectively producing coarse and at least one fine feedback signal, having frequencies which are indicative of the position of the structure. Command signals having frequencies indicative of a desired position of the structure are prerecorded on, for example, a magnetic tape, and the command and feedback signals are compared in coarse and fine frequency comparators to produce error signals which are connected to vary the position of the structure such as to eliminate the error signals and thereby place the structure at the desired position.

To obtain accuracy, the total movement of the structure is divided into a plurality of subdivisions and the fine feedback transducer sweeps a range of frequencies as the structure moves through each subdivision. The coarse channel is adapted to position the structure in one of the subdivisions, and thereafter the fine channel assumes control of the structure and moves it exactly to the desired position.

To eliminate difficulties at the edges of each subdivision, one and preferably two additional fine channels are provided, and the error signals of all the channels, including the coarse, are added together to produce a resultant error signal which actually controls the movement of the structure. Continuous and accurate control of the structure throughout its movement is thus obtained.

It is an object of the present invention to provide a system which is an improvement over the system disclosed in the above-mentioned Vanderbilt patent application.

It is another object to provide a novel system of the foregoing character, wherein a coarse and two fine channels provide accurate and continuous control of a movable structure.

Still another object is to provide a system of the foregoing character, wherein only one channel, either coarse or fine, at a time is in controlling relation with the structure, and the fine channels, when the coarse channel is out of control, are in alternate and exclusive control of the structure.

A further object is to provide a system of the foregoing character, wherein the fine channels are alternately switched into controlling relation with the structure, and switching transients are eliminated.

Still a further object is to provide a system of the foregoing character, including novel means for switching from one fine channel to the other.

A still further object is to provide a system of the foregoing character, which requires fewer components than the system of the above Vanderbilt patent application.

Other objects and advantages of the invention will become apparent from the following description taken in conjunction with the accompanying figures of the drawings, in which.

In general, a system embodying the invention is designed to control a variable parameter in accordance with a prerecorded schedule. The parameter may be the position of a structure such as the table of a milling machine or the carriage of a lathe, which structure is movable along a path of the machine. The system comprises first and second fine channels which respectively include first and second fine position-to-frequency feedback transducers adapted to generate first and second electrical feedback signals each having a frequency which is indicative of the position of the structure. The frequency of the first transducer varies with movement of the structure in accordance with a first position-to-frequency format, and the frequency of the second transducer also varies with movement of the structure but in accordance with a second position-to-frequency format. In each format, the maximum range of movement of the structure is divided into a plurality of subdivisions and in each subdivision the frequency sweeps through a band of frequencies. Further, the edges of the subdivisions of the format of one channel are offset from the edges of the subdivisions of the format of the other channel.

First and second fine command signals, which preferably are prerecorded, are received from a suitable signal source and fed to the first and second channels, respectively, the command signals having frequencies corresponding to the frequencies of the feedback signals at desired positions of the structure. The first fine channel produces a first error signal which is representative of the frequency difference between the signals fed into it, and the second fine channel produces a second error signal which is representative of the frequency difference between the signals fed into it. A drive or actuator means is connected to be responsive to the first and second error signals and is adapted to move the structure in such a manner as to eliminate the error signals.

The system further includes switching means responsive to the position of the structure for causing the drive means to be responsive to only one of the two error signals at a time, the switching means causing the drive means to be alternately responsive to one and then to the other of the error signals. At the locations where the system transfers from one error signal to the other, the feedback and command signals of one channel are substantially equal to the feedback and command signals of the other channel, thereby virtually eliminating switching transients.

A coarse or override channel including a coarse position-to-frequency transducer and responsive to a coarse command signal is preferably also provided to place the structure within a subdivision of one of the fine channels. The format of the override channel is preferably such that the frequency sweeps once from one limit to the other of its band of frequencies as the structure moves once from one end of the path to the other end. The override channel produces a coarse error signal which is connected to actuate the drive means only when the structure is more than a predetermined distance from a desired position, the predetermined distance being less than the length of a subdivision of the fine channels.

In greater detail, the numeral 10 (FIG. 1) indicates a machine which may be a lathe or a milling machine, for example. In this instance, the machine 10 illustrated is a lathe, and comprises a horizontal bed 11 which supports a longitudinally movable carriage 12 having mounted thereon a laterally movable tool rest 13. A drive or lead screw 14 is rotatably mounted on the carriage 12, and is connected to the tool rest 13 to cause lateral movement of the tool rest 13 when rotated.

Figure 1:
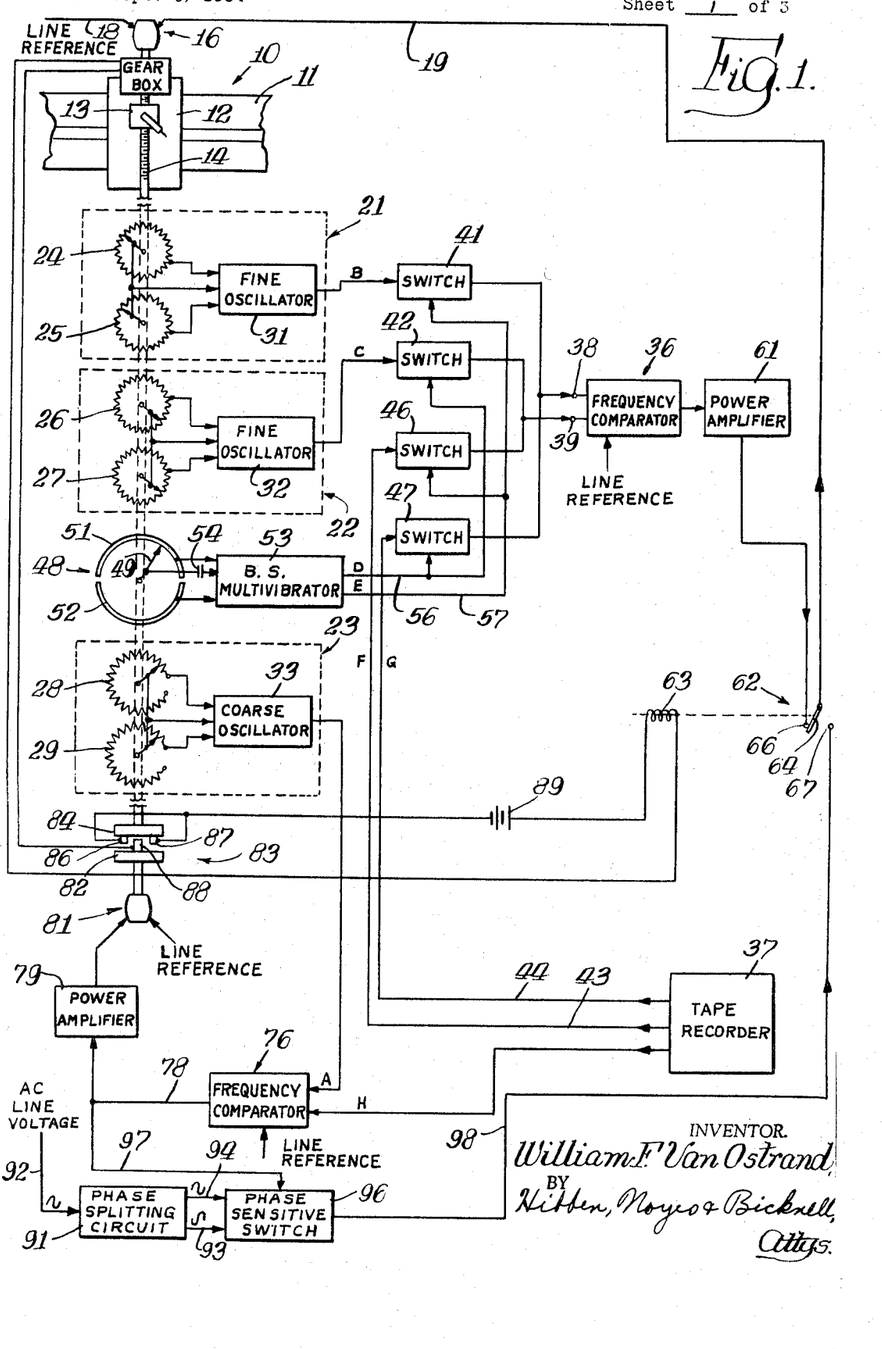
FIG. 1 is a schematic electrical diagram of a control system embodying the invention.

The control system comprises an actuator or control motor 16 also mounted on the carriage 12 and connected through a gear box 17 to the tool rest 13. When energized, the motor 16 causes rotation of the lead screw 14 and movement of the tool rest, as will be described hereinafter. The control motor 16 may be a standard two phase alternating current motor having a reference winding 16a (FIG. 2) and a control winding 16b, the reference winding 16a being connected by a conductor 18 to an AC power source at, for example, 60 c.p.s., and the control winding 16b being connected by a conductor 19 to receive control signals. The construction of the motor 16 is such that a control voltage having the same phase as the reference voltage will cause rotation of the motor 16 in one direction, and a control voltage having a phase opposite that of the reference voltage will cause rotation of the motor 16 in the opposite direction, and the rate of rotation of the motor 16 depends upon the amplitude of the control voltage. While FIG. 1 shows the control motor 16 connected to the lead screw 14 through the gear box 17, it should be understood that the control motor 16 could also be connected to control rotation of the lead screw by controlling the operation of an hydraulic valve of an hydraulic system or by actuating an electrical control in the power circuit of an electric motor.

The control system further comprises two fine frequency channels and an override channel, each channel including a position-to-frequency feedback transducer which is connected to the lead screw 14 and is adapted to generate an electrical signal having a frequency which varies with rotation of the lead screw 14. The fine frequency channels include fine transducers 21 and 22 and the override channel includes a coarse transducer 23. The fine transducer 21 comprises two potentiometers 24 and 25 and an oscillator 31, the fine transducer 22 comprises two potentiometers 26 and 27 and an oscillator 32, and the coarse transducer 23 comprises two potentiometers 28 and 29 and an oscillator 33. The potentiometers 24 to 27 are preferably single turn continuous rotation potentiometers connected as two terminal variable resistors, and the resistance characteristics of the pair of potentiometers 24 and 25 are substantially identical and the resistance characteristics of the pair of potentiometers 26 and 27 are substantially identical. The wipers of all six potentiometers are connected to the lead screw 14 and rotate with the lead screw. Further the wipers of the potentiometers 24 and 25 are electrically connected together and are electrically connected in the circuit of the oscillator 31 in such a manner that rotation of the wipers causes a variation in the frequency of the ouptut signal of the oscillator 31. The construction of the oscillator 31 is preferably such that the oscillator frequency varies in direct proportion to variation of the resistance of potentiometers 24 and 25 which are identical. This arrangement of the potentiometers 24 and 25 and the oscillator 31 is similar to the arrangement shown and described in the above-mentioned Vanderbilt patent application.

Similarly, the potentiometers 26 and 27 are identical and connected together and to the oscillator 32, and a variation in the position of the wipers and the resistance of the potentiometers 26 and 27 causes a variation in the frequency of the output signal of the oscillator 32.

The two potentiometers 28 and 29 of the coarse transducer 23 are preferably identical multiturn potentiometers, and the construction is such that the wiper of each potentiometer 28 and 29 sweeps once across the entire length of the associated resistance element as the lead screw 14 is rotated through enough revolutions to move the tool rest 13 from one end of its movement to the other end. The two potentiometers 28 and 29 are also electrically connected together and to the coarse oscillator 33 in such a manner that a change in the resistance presented by the two potentiometers 28 and 29 causes a change in the frequency of the output signal of the oscillator 33, and the construction is preferably such that the oscillator frequency is at a minimum when the tool rest 13 is at one end of its travel and gradually increases with movement of the tool rest 13 toward the other end.

Figures 3, 4, 5, 6, 7:
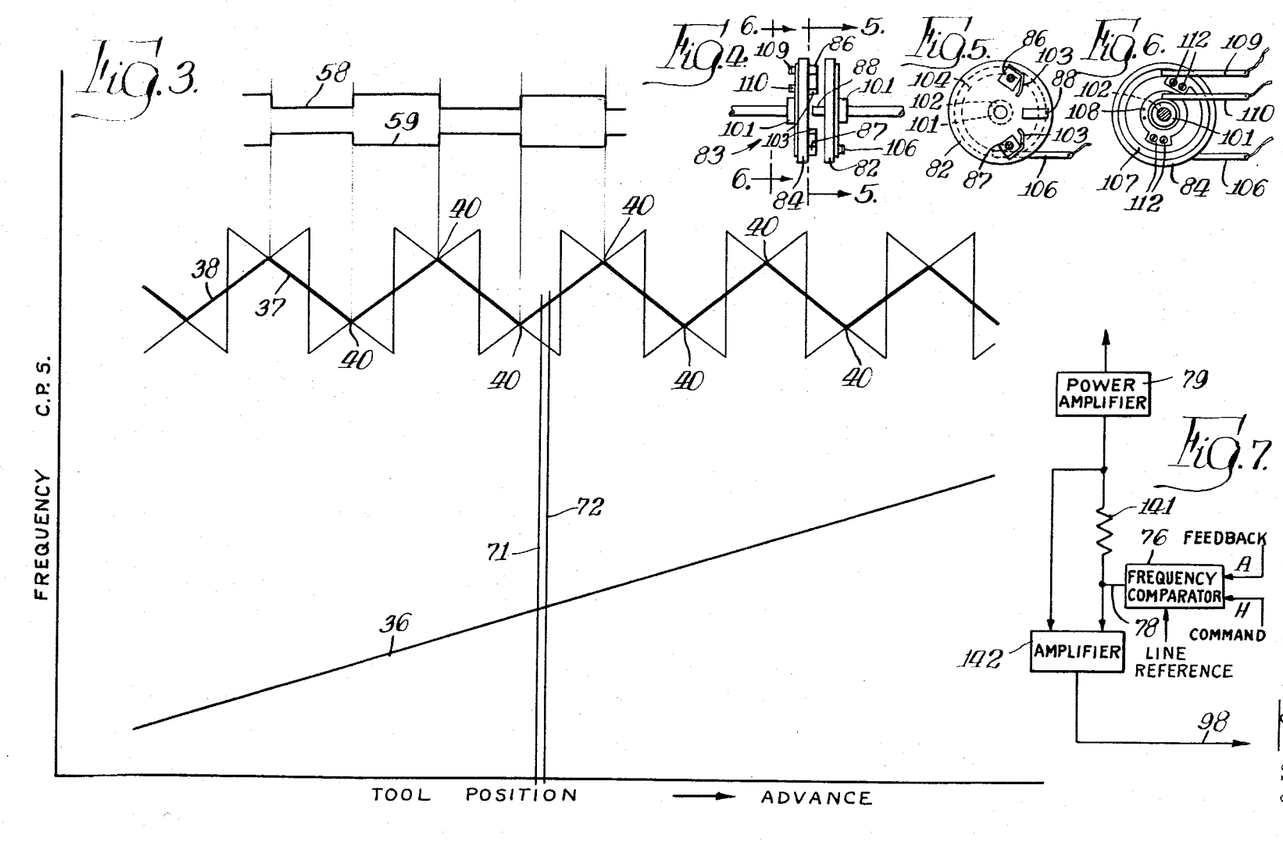
FIG. 3 shows curves which illustrate the operation of the system shown in FIG. 1.
FIG. 4 is an elevational view showing a switch of the system of FIG. 1.
FIG. 5 is a sectional view taken on the line 5—5 of FIG. 4.
FIG. 6 is a sectional view taken on the line 6—6 of FIG. 4.
FIG. 7 is a schematic electrical diagram of an alternative form of a portion of the system shown in FIG. 1.

Since the frequency of each oscillator 31 to 33 is directly proportional to the resistance of its associated potentiometers and the potentiometers are connected to the lead screw, it will be apparent that the format, or the relation between frequency variation and movement of the tool rest 13, for each of the oscillators depends upon the construction of the potentiometers. In the case of the coarse transducer 23, the change of resistance of the resistance element of each of the potentiometers 28 and 29 is preferably linear with change in the position of the tool rest 13, and consequently the frequency of the output signal of the oscillator 33 is also linear. With reference to FIG. 3, the curve indicated by the numeral 36 represents the variation in frequency of the oscillator 33 with variation in the position of the tool rest 13. The frequency of the oscillator 33 preferably varies in a straight line and gradually increases as the tool rest 13 moves from one end of its travel to its other end.

In the case of transducer 21, the output signal of the oscillator 31 is represented by the curve 38 in FIG. 3. The construction of each potentiometer 24 and 25 is such that the resistance of each potentiometer gradually increases in a straight line from a minimum value at the point of connection of the resistance element to the oscillator 31, to a maximum value which is reached when the wiper has made one complete revolution. At the connection point between each potentiometer and the remainder of the oscillator, there is a discontinuous jump back from the maximum value to the minimum value as rotation of the shaft 14 and the wipers continues.

A curve showing the frequency-position characteristic of the oscillator 32 of the transducer 22 is represented by the numeral 37 in FIG. 3. The resistance of each potentiometer 26 and 27 decreases in a linear manner from a maximum value at the point of connection of the resistance element of each potentiometer to the remainder of the oscillator 32. At the end of each revolution of the wipers, the resistance arrives at a minimum value and then it jumps back to its maximum value again as the point of connection is reached.

Thus, the frequency of the output signal of the oscillator 31 varies in the manner of a saw tooth wave having a positive slope portion and a discontinuous jump back, and the frequency of the oscillator 32 also varies in the manner of a saw tooth wave but has a negative slope portion and a discontinuous jump back. For each of the transducers 21 and 22 of the fine channels, the total distance of travel of the tool rest 13 is thus divided into a plurality of subdivisions, the length of each subdivision being equal to the distance traveled by the tool rest 13 for one complete revolution of the lead screw 14 and the wipers of the potentiometers. Within each subdivision, the frequency of each oscillator 31 and 32 is indicative of the position of the tool rest 13 within that subdivision. Thus, the output signals of the transducers 21 and 22 are referred to herein as fine position feedback signals because they are indicative of the position of the tool rest 13 within a subdivision. In the case of the coarse transducer 33 of the override channel, the oscillator 33 sweeps once through a band of frequencies as the tool rest 13 moves from one end of its path to the other. Each frequency with the latter band is identified with only one position of the tool rest 13, and therefore the output signal, referred to as the coarse position feedback signal, of the oscillator 33 is indicative of the position of the tool rest 13 along the entire path.

With reference again to the two fine channels, the edges of the subdivisions of one channel are offset from the edges of the subdivisions of the other channel. As shown by the curves 37 and 38 of FIG. 3, this offset is such that the edges of one subdivision fall substantially midway between the edges of the other subdivision, and this offset is obtained by offsetting the wipers of the potentiometers 24 and 25 substantially 180° from the wipers of the potentiometers 26 and 27. Further, since the resistances of all of the potentiometers 24 to 27 are substantially equal, the oscillators 31 and 32 will sweep through the same band of frequencies, and at certain positions of the tool rest 13, the frequencies of the two oscillators 31 and 32 will be equal. With reference to FIG. 3, these positions are at the intersections of the two curves 37 and 38, the intersections being indicated by the numeral 40.

Command signals are prerecorded on the memory element of a command signal source, such as the tape of a tape recorder 37, there being one command signal associated with each of the previously described feedback signals. The frequency of the command signal for each channel is set at the frequency of its associated feedback signal for a desired position of the tool rest 13. Since the frequencies of the two fine position feedback signals are within the same band, a separate track on the tape is preferably provided for each channel.

To obtain command signals having frequencies corresponding to a desired position or corresponding to a continuous series of desired positions, the tool rest 13 may be manually maneuvered to the desired position or positions and the feedback signals produced by the transducers 21, 22 and 23 may be recorded on the tape. On the other hand, command signals may also be obtained by providing a programming device having potentiometers and oscillators similar to those shown in FIG. 1, the device being designed to simulate the operation of the machine 10.

The control system further comprises a frequency comparator circuit 36 (FIG. 1), which is designed to receive the fine position feedback signals from the transducers 21 and 22 and also to receive the fine command signals from the tape recorder 37, and to compare the frequency of a feedback signal with the frequency of its associated command signal and produce an error signal that varies in both phase and amplitude with differences between the two frequencies.

The frequency comparator circuit, which will be described in greater detail hereinafter, has two signal input terminals 38 and 39 (FIG. 1). The feedback signal from the oscillator 31 is connected to the input terminal 38 through a switch 41, which may be a standard electronic switch, and the feedback signal from the oscillator 32 is connected to the input terminal 39 through a similar switch 42. The command signal which is associated with the feedback signal generated by the oscillator 31 is connected by a conductor 43 to the input terminal 39 of the comparator circuit 36 through another switch 46, and the command signal which is associated with the feedback signal generated by the oscillator 32 is connected by a conductor 44 to the input terminal 39 of the comparator circuit 36 through still another switch 47. Since it is desired that only one feedback signal and its associated command signal be connected to the terminals 38 and 39 at a time, a switching device, indicated generally by the numeral 48, is connected to control the switches 41, 42, 46 and 47 in such a manner as to alternately switch the feedback signal from the oscillator 31 and the command signal on the conductor 43 to the frequency comparator circuit 36 and then switch the feedback signal from the oscillator 32 and the command signal on the conductor 44 to the comparator circuit. The switching device 48 comprises a wiper 49 which is connected to the lead screw 14, and rotates with the lead screw, and two electrically conductive segments 51 and 52. The two segments 51 and 52 and the wiper 49 are connected in the circuit of a bistable multivibrator 53, a battery 54 also being connected in series with the wiper 49 and the remainder of the bistable multivibrator 53 circuit. When the wiper 49 engages the segment 51, a circuit path is completed through the battery 54, the wiper 49 and the segment 51, and when the wiper 49 engages the segment 52, another circuit path is completed through the battery 54, the wiper 49 and the segment 52. The multivibrator 53, which has a conventional construction, has two stable conditions or states, and it is triggered to one of its states when the wiper 49 engages one of the segments 51 and 52 and it is triggered to its other state when the wiper 49 engages the other of the segments. Further, the construction of the multivibrator is such that it remains in one of its states after the wiper moves out of engagement with the segment associated with that state and it does not transfer to its other state until the wiper moves into engagement with the other of the segments.

Two conductors 56 and 57 are connected in the multivibrator 53 circuit, and curve 58 (FIG. 3) represents the voltage appearing on conductor 56 and curve 59 represents the voltage appearing on conductor 57. It will be noted that each curve 58 and 59 is a square wave having a relatively positive portion and a relatively negative portion.

The conductor 56 is connected to control actuation of the two switches 42 and 47, and the conductor 57 is connected to control actuation of the other two switches 41 and 46. The four switches 41, 42, 46 and 47 are preferably identical and are constructed such that they will open and pass the signals appearing at their input terminals when the control voltages from the multivibrator 53 are in the more positive portion of their cycles. Thus, for each complete revolution of the lead screw 14 and the wiper 49 of the switching device 48, first the switches 41 and 46 will be open and pass the feedback signal from the transducer 21 and the command signal appearing on the conductor 43 to the input terminals 38 and 39 of the frequency comparator circuit 36, and the two switches 42 and 47 will be closed. During the other half cycle, the switches 42 and 47 will be open and the switches 41 and 46 will be closed, and the feedback signal from the transducer 22 and the command signal appearing on the conductor 44 will be passed to the input terminals 38 and 39 of the frequency comparator circuit 36.

It will be recalled that at certain positions, indicated by the numeral 40 (FIG. 3), of the tool rest 13 along the path, the frequencies of the oscillators 31 and 32 are equal. The position of the wiper 49 of the switching device 48 is set such that the multivibrator 53 is triggered from one of its states to the other of its states at the positions 40. Further, the wiper 49 is set such that the switches 41 and 46 will be closed during the half cycle of the curve 38 which includes the discontinuous jump back, and the switch 41 and 46 are open during the other half cycle. Similarly, the switches 42 and 47 will be closed during the half cycle of the curve 37 which includes the discontinuous jump back, and are open during the other half cycle.

The frequency comparator circuit 36 is constructed such that, when the frequency of the signal appearing at the terminal 38 is lower than the frequency of the signal appearing at the terminal 39, the output signal of the comparator circuit 36, referred to herein as the fine error signal, will have a positive phase, and conversely when the frequency of the signal appearing at the terminal 39 is lower than the frequency of the signal at the terminal 38, the phase of the error signal will be negative. The error signal from the frequency comparator circuit 36 is amplified by a power amplifier 61 and the output from the amplifier 61 is connected to the control winding 16b (FIG. 2) of the control motor 16 through a two position solenoid controlled switch 62. A positive phase voltage on the control winding 16b causes the motor 16 to rotate the lead screw 14 such as to advance the tool rest 13, and a negative phase voltage causes a withdrawal of the tool rest 13.

The switch 62 includes a solenoid 63, a movable contact 64, and two stationary contacts 66 and 67. The stationary contact 66 is connected to the output of the power amplifier 61 and the stationary contact 67 is connected to the override channel. The movable contact 64 of the switch 62 is connected directly to the control winding 16b of the motor 16, and consequently when the movable contact 64 engages the stationary contact 66, the motor 16 is under the control of the fine error signal appearing at the output of the amplifier 61, and when the movable contact 64 engages the stationary contact 67 the control motor 16 is under the control of an override signal from the override channel. Further, the construction of the switch 62 is such that the movable contact 64 normally engages the stationary contact 66 and is switched over to the other stationary contact 67 only when the solenoid 63 is energized.

To understand the operation of the portion of the system described thus far, assume that the tool rest 13 is at the location indicated by the line 71 in FIG. 3. At this position of the tool rest 13, the frequency of the oscillator 31 may be determined by noting the intersection of the curve 38 and the line 71, and the frequency of the oscillator 32 may be determined from the intersection of the curve 37 and the line 71. The two fine position feedback signals from the transducers 21 and 22 are fed to the two switches 41 and 42, but at this position of the tool rest 13 the switch 41 is open and the switch 42 is closed, and therefore the feedback signal from the transducer 21 appears at the terminal 38 and the signal from the transducer 22 is blocked. If it is desired to gradually advance the tool rest 13 from the position 71, the frequencies of the command signals associated with the two fine feedback signals are made equal to the frequencies of the feedback signals at a location slightly in advance of the actual position of the tool rest 13. For example, the frequencies of the command signals recorded on the tape of the recorder 37 may correspond to the frequency of the feedback signals at the location indicated by the line 72. Since the switches 41 and 46 are simultaneously open, the command signal appearing on the conductor 43 will be passed through the switch 46 to the terminal 39 of the frequency comparator circuit 36. The switch 47 is closed and thus prevents the command signal appearing on the conductor 44 from being passed to the frequency comparator circuit. The frequency of the command signal at the terminal 39 will be slightly higher than the frequency of the feedback signal at the terminal 38, with the result that the error signal appearing at the output of the frequency comparator circuit 36 will have a positive phase and sufficient amplitude, when amplified by the power amplifier 61, to energize the control motor 16 and cause the tool rest 13 to be advanced. To gradually advance the position of the tool rest 13, the frequency of the command signals on the conductors 43 and 44 should be gradually changed in such manner as to always correspond to the feedback signal frequencies associated with locations slightly in advance of the actual position of the tool rest 13.

With reference again to FIG. 3, as the tool holder 13 advances from the position of the line 71, it will eventually reach the position 40 which is next adjacent to the location 71 and is to the right of the location 71. As previously explained at this position 40 the frequency of the feedback signal of oscillator 31 is exactly equal to the frequency of the feedback signal of the oscillator 32 and at this position the multivibrator 53 signals close the switches 41 and 46 open the switches 42 and 47. Thus, at this position 40 the output from the feedback transducer 22 and the signal appearing on the conductor 44 will be connected to the input terminals 38 and 39 of the frequency comparator circuit 36. Since the slope of the curve 37 is negative, the frequency of the command signal on the conductor 44 will now be less than the frequency of the associated feedback signal. To cause the error signal appearing at the output of the frequency comparator circuit 36 to continue to have a positive phase, and thus cause continued advance of the tool rest 13, the connections from the transducer 22 and the conductor 44 to the comparator circuit 36 are reversed as compared to the connections from the transducer 21 and the conductor 43 to comparator circuit 36. Whereas the transducer 21 was connected to the terminal 38 and the conductor 43 was connected to the terminal 39, the transducer 22 is connected to the terminal 39 and the conductor 44 is conneced to the terminal 38. Accordingly, the frequency of the signal on the terminal 39 will still be greater than the frequency of the signal on the terminal 38, the error signal will still have a positive phase, and the tool holder will continue to be advanced. When the next adjacent position 40 is reached, the bistable multivibrator 53 will again close the switches 42 and 47 and open the switches 41 and 46 and the fine channel including the transducer 21 and the conductor 43 will again be in controlling relation with the control motor 16 and the tool rest 13. In this manner, control of the motor 16 and consequently the tool rest 13 will be alternately and exclusively under the control of first one fine channel and then the other fine channel.

An important feature of the system described herein is that the frequencies of all of the signals may be in the audio range and not in the radio range. The preferred audio frequency range is between 1,000 c.p.s. and 20,000 c.p.s. This is important because difficulties encountered when using radio frequencies are not present in an audio frequency system.

Since the frequency band for each of the two fine frequency channels is repeated in each of the subdivisions, the two fine frequency channels can accurately control the position of the tool rest 13 only so long as the desired position is within the same subdivision of the channel having control as the actual position of the tool rest 13. In other words, if the actual position of the tool rest 13 is in one subdivision of the channel having control and the desired position is in a subdivision which is three or four subdivisions away from the actual position, this condition will not be recognized by the two fine frequency channels and the tool rest 13 will be moved to a location within the subdivision where it actually resides, having a frequency that corresponds to the frequency of the desired position within the other subdivision. Therefore, the override channel is provided to ensure that the actual position of the tool rest will always be within the subdivision of the desired position of the tool rest 13. In fact, the override channel ensures that the actual position of the tool rest 13 will always be within approximately one-sixth of a subdivision from the desired position.

The override channel comprises the previously described coarse position feedback transducer 23 which produces a coarse feedback signal, the frequency of which varies linearly (curve 36, FIG. 3) with change of position of the tool rest 13. The coarse feedback signal from the transducer 23 is connected to an input terminal of another frequency comparator circuit 76 which also receives a prerecorded coarse command signal from the tape recorder 37. The frequency of the coarse command signal is equal to the frequency of the coarse feedback signal at a desired position of the tool rest 13. The frequency comparator circuit is similar to the circuit 36 and produces a coarse error signal which appears on a conductor 78, the phase of the coarse error signal indicating whether the desired position is in advance or behind the actual position of the tool holder 13 and the amplitude of the coarse error signal indicating the distance between the actual and desired positions. The coarse error signal appearing on the conductor 78 is amplified by a power amplifier 79 and is connected to the control winding 81b (FIG. 2) of another actuator such as a two phase control motor 81 which may be similar to the control motor 16. The motor 81 also includes a reference winding 81a which is connected to a line reference voltage source. The drive shaft of the control motor 81 is connected to rotate one segment 82 of a dead zone switch 83, the construction of which will be described in greater detail hereinafter with regard to FIGS. 4 to 6. The switch 83 includes another segment 84 which is connected to the lead screw 14 of the machine 10 and rotates with the wipers of the potentiometers 24 to 29 and the wiper 49 of a switching device 48. The purpose of the dead zone switch 83 is to connect the override channel into controlling relation with the control motor 16 and to disconnect the two fine channels from controlling relation with the control motor 16 in the event the actual position of the strucure is a least a predetermined distance from the actual position. Briefly, segments 82 and 84 of the dead zone switch may be coaxial disks, and two electrically conductive elements 86 and 87 are secured to the inner face of the segment 84 at angularly displaced positions and another electrically conductive element 88 is secured to the inner face of the other segment 82 and positioned between the two elements 86 and 87. The two elements 86 and 87 are electrically connected together and are connected in series with a battery 89, the solenoid 63 of the switch 62, an electrical control in the gear box 17 of the machine 10, and the segment 88 on the other segment 82. Thus, if the element 88 engages either one of the elements 86 or 87 the circuit will be closed and current will flow through the solenoid 63 and the movable contact 64 of the switch 62 will be moved into engagement with the stationary contact 67, which as previously explained connects the override channel into controlling relation with the control motor 16. The electrical control in the gear box 17 is such that it effects a change in gear ratio and increases rate of rotation of the lead screw when the override channel has control. If desired, however, the gear box 17 may be omitted and the control motor 16 connected directly to the lead screw 14, in which case the element 88 of the switch 83 would be connected directly to one side of the solenoid 63 of the switch 62.

The override channel further includes a phase splitting circuit 91 (FIG. 1) which has its input connected by a conductor 92 to an AC voltage source, which is preferably the same source as used for the line reference voltage connected to the frequency comparator circuits 36 and 76 and the control motors 16 and 81. Two conductors 93 and 94 are connected to the two output terminals of the phase splitting circuit 91, and the voltages appearing on the two conductors 93 and 94 will be substantially equal in amplitude but 180 degrees out of phase with each other. The two conductors 93 and 94 are connected to the input of a phase sensitive switch circuit 96 which is also connected by a conductor 97 to receive the coarse error signal appearing on the conductor 78. The construction of the phase sensitive switch 96 is such that, when the coarse error signal has one phase, the voltage appearing on the conductor 93 will be passed to the output conductor 98 of the switch 96 and the voltage on the other conductor 94 will be blocked, and conversely when the coarse error signal has the opposite phase, the voltage appearing on the conductor 94 will be passed to conductor 98 and the voltage appearing on the other conductor 93 will be blocked. The conductor 98 connects the output of the switch 96 to the stationary contact 67 of the switch 62.

In the operation of the override channel, assume that the desired position of the tool rest 13 is a considerable distance away from its actual position. This may occur when it is desired to move the tool rest 13 very quickly to a new position which is considerably displaced from the present position. In such circumstances, the coarse command signal will have a frequency which is considerably displaced from the frequency of the coarse feedback signal and consequently the coarse error signal appearing on the conductor 78 will have a substantial amplitude and a phase depending on the direction of the desired position of the tool holder 13 relative to its actual position. This coarse error signal energizes the control motor 81 which is connected to rotate the segment 82, and the segment 82 begins to turn but the element 88 immediately makes electrical contact with one of the two elements 86 or 87 on the segment 84. The control motor 16 is easily able to override the other control motor 81, so that the motor 81 cannot exert enough force to turn the screw 14, but the motor 81 holds the element 88 in firm electrical contact with the contacted element 86 or 87. The one of the elements 86 or 87 which is engaged by the element 88 depends of course upon the direction of the desired position relative to the actual position. As soon as the element 88 contacts one of the elements 86 and 87, the solenoid 63 of the switch 62 is energized and the movable contact 64 is transferred from the stationary contact 66 to the other stationary contact 67, thereby transferring control of the motor 16 from the fine error signal to the override signal. Simultaneously with the foregoing action, the phase of the coarse error signal appearing on the conductor 78 causes the phase sensitive switch 96 to connect one or the other of the two conductors 93 and 94 to the output conductor 98, and the override signal on the conductor 98 is connected directly to the control motor 16. The amplitude of the override signal is sufficient to saturate the control winding 16b of the motor 16 causing the motor to rotate at its maximum rate. Further, when the gear box 17 is provided, the electrical control within the gear box 17 changes the gear ratio of the gear box 17 such that the rate of rotation of the lead screw 14 relative to the motor 16 is increased. Thus, the tool rest 13 is moved very rapidly toward the desired position.

As the tool rest 13 moves toward the desired position, the amplitude of the coarse error signal on the conductor 78 decreases and consequently the motor 81 approaches a stopped condition. The amplitude of the override signal remains constant because it is derived from the AC power supply. When the actual position of the tool rest 13 is closely adjacent the desired position, the element 88 on the segment 82 of the dead zone switch moves out of contact with the two elements 86 and 87 on the segment 84, causing deenergization of the solenoid 63 of the switch 62 and return of the gear ratio of the gear box 17 to its normal value. Due to deenergization of the solenoid 63, the movable contact 64 returns to engagement with the stationary contact 66 and again connects the fine error signal from the comparator circuit 36 into controlling relation with the control motor 16, and the two fine channels again resume control of the tool rest 13 to the exclusion of the override channel. Operation then continues under the control of the two fine channels until another step function is introduced on the control tape.

The construction of the dead zone switch 83 is shown in greater detail in FIGS. 4 to 6. The two segments 82 and 84 are coaxial disk-like members, each fastened to a shaft by a collar 101 and a set screw 102. The element 88 on the segment 82 is fastened to the inner face of the segment 82, which is adjacent the face of the segment 84, and adjacent the outer periphery of the segment 82. The two segments 86 and 87 are fastened to the inner face of the segment 84, which is the face adjacent the segment 82, and adjacent the outer periphery of the segment 84, with one of the elements 86 and 87 positioned on each side of the element 86 as shown in FIG. 5. Each of the elements 86 and 87 may include a flexible metal leaf 103 on its side adjacent the element 88 to ensure good electrical contact between the element 88 and the two elements 86 and 87.

Electrical connections between the elements 86 to 88 and the external circuit may be made by means of wipers and slip rings. A slip ring 104 (FIGS. 4 and 5) is fastened to the outside face of segment 82 and is engaged by a wiper 106, which, in FIG. 1, is connected to the gear box 17. The segments 82 and 84 are made of an electrical insulating material, and an electrical connection may be made between the slip ring 104 and the element 88 by means of a screw which extends through the segment 82 and is threaded into both the slip ring 104 and the element 88. Similarly, two slip rings 107 and 108 are secured to the outer face of the other segment 84 and are respectively engaged by two wipers 109 and 110. With reference to FIG. 1, the two wipers 109 and 110 are electrically connected together and to the battery 89. Once again, electrical connection may be made between the slip rings 107 and 108 and the elements 86 and 87 by means of screws 112 (FIG. 6) which extends through the segment 84 and are threaded into both the slip rings 107 and 108 and the elements 86 and 87.

Figure 2:
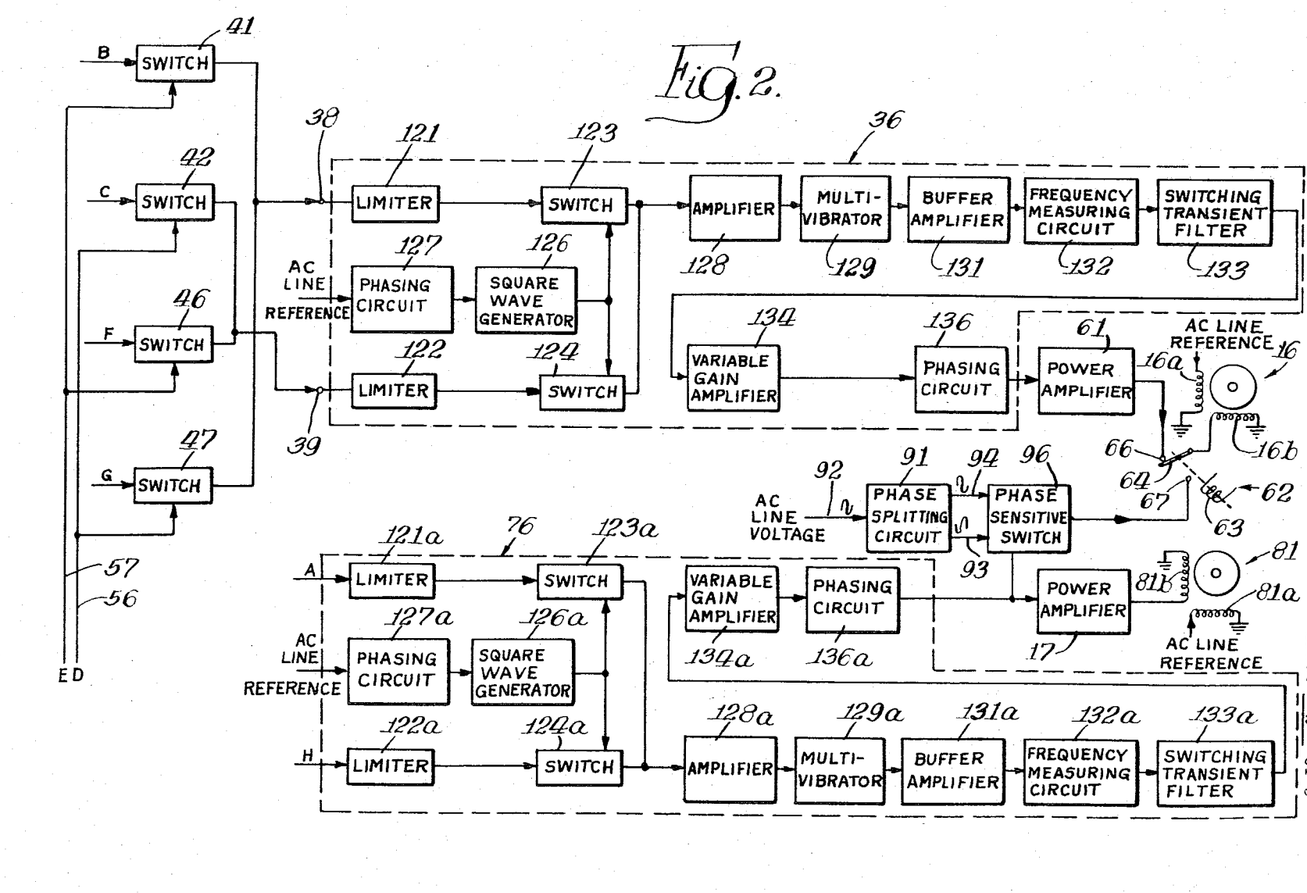
FIG. 2 is a more detailed schematic electrical diagram of a portion of the system shown in FIG. 1.

FIG. 2 shows in greater detail the construction of a portion of the system shown in FIG. 1, this figure being particularly directed to the construction of the two frequency comparator circuits 36 and 76. Since the two frequency comparator circuits 36 and 76 are similar, a detailed description of the circuit 36 will suffice for the two. Further, the components in the frequency comparator circuit 36 will be given reference numbers and the corresponding components in the frequency comparator circuit 76 will be given the same number but with the letter *a* affixed thereto. Still further, the capital letters on certain conductors in FIG. 2, are also shown in FIG. 1 adjacent the same conductors.

As previously explained, the four switches 41, 42, 46 and 47 are connected to the input terminals 38 and 39 of the frequency comparator circuit 36, and these switches act in conjunction with the switching device 48 to connect one fine feedback signal and one fine command signal to the input terminals 38 and 39 at a time. The input connections to the other frequency comparator circuit 76 are of course always connected to the output of the coarse feedback transducer 23 and the output of the tape recorder 37, as previously explained.

The frequency comparator circuit 36 is designed to compare the frequencies of the two signals appearing at the terminals 38 and 39 and to produce an error signal having characteristics which indicate the frequency relation between the two input signals. The characteristics of the error signal that indicate the frequency relationship between the input signals are its phase and amplitude, the phase indicating which of the two input signals has the higher frequency and its amplitudes indicating the extent of the frequency difference. The terminals 38 and 39 are respectively connected to the inputs of two limiter circuits 121 and 122 which limit the amplitudes of the incoming signals. A pair of switches 123 and 124 are connected to the outputs of the limiters 121 and 122, respectively, the two switches 123 and 124 being under the control of a square wave generator 126. The generator 126 is preferably actuated by an AC line reference voltage, which has the same frequency as the previously referred to reference voltages, and which is first passed through a phasing circuit 127. The generator 126 causes the two switches 123 and 124 to alternately pass their input signals from the limiters 121 and 122 to an amplifier 128 in synchronism with the reference voltage. When the line reference voltage is a 60 cycle source, the command and feedback signals are alternately fed into the amplifier 128 and appear at the amplifier 128 input for sample periods of ¹⁄₁₂₀ of a second. The two switches 123 and 124 may be mechanical chopper switches but, electronic switches are preferred. As previously stated, the two limiters 121 and 122 prevent overloading of the switches and spillover of one signal into the sample period of the other signal.

From the amplifier 128, the signals are fed to a bistable multivibrator 129, a buffer amplifier 131, and a frequency measuring circuit 132. The amplifier 128 amplifies the incoming sampled signals to a level to ensure reliable triggering of the multivibrator 129, which duplicates with a square wave each cycle of the sampled signals. The multivibrator 129 output wave form is required to be of constant slope and amplitude only from ¹⁄₁₂₀ of a second, assuming a 60 cycle source, sampling period to the next. The buffer amplifier 131 prevents loading of the multivibrator 129 and furnishes sufficient drive for the frequency measuring circuit 132.

The frequency measuring circuit 132 accomplishes a frequency to direct current conversion by integrating the pulses fed into it. When the frequency, and consequently the number of square wave pulses, in the first ¹⁄₁₂₀ of a second sample period is low as compared to the frequency in the second period, the direct current output voltage of the circuit 132 is also relatively low during the first period and it rises during the second sample period when the frequency increases. The result is a direct current voltage having an alternating current component. The alternating current component has the same period as the reference voltage and it is either in phase or out of phase with the reference voltage. When the frequencies of the two input signals appearing at the terminals 38 and 39 are identical, the output of the circuit 132 is a straight line, and when the frequency of the signal appearing at the terminal 38 is relatively high as compared to the frequency of the signal appearing at the terminal 39, the output voltage of the circuit 132 first rises and then falls. Conversely, when the frequency of the signal at the terminal 39 is greater than the frequency of the signal at the terminal 38, the output voltage from the circuit 132 falls and then rises. It is apparent, therefore, that the output voltage of the circuit 132 has a peak-to-peak value that is proportional to the frequency difference between the two signals appearing at the terminals 38 and 39, and a phase that indicates which of the two signals has the higher frequency. The frequency measuring circuit 132 also preferably contains a low pass filter that passes the 60 cycle line component, assuming a 60 cycle reference voltage, but suppresses the frequencies of the command and feedback signals.

A noise component may also appear as the output of the frequency measuring circuit 132 due to the operation of the two switches 123 and 124. When the frequency of the line reference voltage is 60 c.p.s., the noise frequency will be 120 c.p.s. While a noise component at this frequency cannot operate the type of actuators employed or directly introduce an error into the system, this noise component can saturate the amplifiers and prevent the system from responding to the real error input. To eliminate this noise component, a switching transient filter 133 is preferably connected to the output of the frequency measuring circuit 132 to suppress this noise component. When the frequency of the AC line reference voltage is 60 c.p.s., the filter 133 may be a 120 cycle notch filter.

The output of the filter circuit 133 is connected to a variable gain amplifier circuit 134 and to a phasing circuit 137 which in turn delivers the signal to the previously mentioned power amplifier 61. These two circuits 134 and 136 adjust the amplitude and the phase of error signal prior to its being fed to the power amplifier 61 and the control motor 16.

The components of the frequency comparator circuit 76 may be similar to those of the comparator circuit 36. The output of a phasing circuit 136a of the comparator circuit 76 is connected to both the power amplifier 79 and also to the phase sensitive switch 96, which determines the phase of the override voltage past.

It should again be stressed that a two phase alternating current motor need not be used as a drive or actuator since any type of actuator may be employed that responds to the type of error signal provided by the frequency comparator circuits. Thus, any hydraulic pilot valve that is actuated by the suppressed carrier line frequency error signal may also be used.

During operation, it will be apparent that although three channels, each including a position-to-frequency transducer, are provided and three sets of feedback and command signals are employed, only one channel is connected in controlling relation with the control motor 16 at a time. The fine channels of the system obtain excellent accuracy by dividing the total travel of the tool rest 13 up into a plurality of relatively small subdivisions and having the fine transducers sweep a range of frequencies in each subdivision. Since difficulty might occur at the edges of each subdivision if only one fine channel were used, two fine channels are provided and the subdivisions of one fine channel are offset from the subdivisions of the other fine channel, and the two fine channels are alternately switched into controlling relation with the control motor 16. An important feature of the invention is the fact that switching between the two fine channels takes place at positions where the frequencies of one fine channel are substantially equal to the frequencies of the other fine channel. Since there is little or no frequency jump when transfer is made from one fine channel to the other, undesirable transient signals which might prevent accurate positioning of the tool rest 13 under all conditions or in all positions are eliminated.

Under most conditions of operation, the two fine channels are in alternate and exclusive control of the control motor 16, and the override channel is disconnected from the control motor 16. However, under certain conditions, such as when a rapid change in the position of the tool rest 13 over a relatively large distance is desired, the control winding of the control motor 16 is switched to receive an override signal from the override channel to the exclusion of the two fine channels until the position of the tool rest 13 is within a fraction of a subdivision of the desired position, after which time the control motor 16 is switched back again to the two fine channels and the override channel is again placed in a standby status. In the embodiment of the invention described, the fraction is approximately one-sixth of a subdivision, but this fraction may be changed simply by changing the angular distance between the elements 86 to 88 of the dead zone switch.

FIG. 7 illustrates an alternative construction of a portion of the override channel. In the circuit of FIG. 7, the phase splitting circuit 91 and the phase sensitive switch 96 are omitted and the coarse error signal appearing on the conductors 78 is connected to the power amplifier 79 through a resistor 141. The voltage appearing across the resistor 141 is proportional in phase and amplitude to the coarse error signal from the frequency comparator circuit 76, and this voltage drop across the resistor 141 is connected to the input of an amplifier 142 which has its output connected to the conductor 98 leading to the switch 62. It will be apparent that a phase splitting circuit is not required in the circuit of FIG. 7 because the voltage drop appearing across the resistor 141 will always have a phase proportional to the coarse error signal and will correctly indicate the desired direction of movement of the tool rest 13. The signal appearing across the resistor 141 is of course amplified by the amplifier 142 and is sufficient to drive the control motor 16. However, the amplitude of the voltage drop appearing across the resistor 141, and therefore the voltage delivered to the control winding 16b of the motor 16 during override conditions, will gradually decrease in amplitude as the actual position of the tool rest 13 approaches the desired position due to the construction of the frequency comparator circuit 76. In the override channel shown in FIG. 1, on the other hand, the amplitude of the override voltage appearing on the conductor 98 will have a constant amplitude since the override voltage is derived from the line reference voltage source.

I claim:

1. Apparatus for controlling the position and movement of a structure along a path, comprising actuator means for moving the structure along the path, two control means each responsive to the distance between the actual position of the structure and a desired position for producing signals of changing frequency indicative of such distance, each of said control means generating its signal in accordance with a predetermined change of frequency format and changing inversely to the other with the formats of said two control means crossing each other at predetermined points of equal frequency, and switching means for switching said actuator means from one of said control means to the other of said control means at said predetermined points of crossing.

2. Apparatus for controlling the position and movement of a structure which is movable along a path, comprising actuator means for moving the structure along the path, first and second fine channels, each of said fine channels comprising a transducer adapted to be responsive to the position of the structure and produce a feedback signal having a characteristic which is a function of the actual position of the structure along the path, said position-to-characteristic function of each of said transducers being such that the length of the path is divided into a plurality of subdivisions and the variation of said characteristic is repeated in each of said subdivisions, and said transducers being constructed such that the edges of said subdivisions of one of said transducers are offset from the edges of said subdivisions of the other of said transducers, comparator means for comparing said feedback signals of said first and second fine channels with first and second command signals, respectively, said first and second command signals being derived from a signal source and each of said command signals having a characteristic which corresponds to said characteristic of its associated feedback signal, said characteristic of each of said command signals being chosen to represent a desired position of said structure on said path, said comparator means being adapted to compare said characteristics of said feedback signals of said first and second command signals and to provide first and second error signals, respectively, each of said error signals having at least one error characteristic which is representative of the actual position of the structure relative to the desired position of the structure, switch means having first and second positions, said switch means when in said first position being operable to connect said first error signal to said actuator means and when in said second position to connect said second error signal to said actuator means, and switch actuator means responsive to the actual position of the structure for actuating said switch means such that said first and second error signals are alternately connected to actuator means as said structure is moved along the path, said position-to-characteristic functions of said first and second transducers being such that at spaced locations along the path said characteristics for said feedback and command signals of said first channel are substantially identical with said characteristics of said feedback and command signals of said second channel, and said actuator means is operable to actuate said switch means between said first and said second positions at said spaced locations, said switch comprising two substantially identical electrically conductive segments, an electrically conductive wiper connected to be moved by said actuator means in synchronism with the structure, said wiper moving across alternately one and then the other of said segments as said actuator means moves the structure along the path, and circuit means connected to said segments and said wiper for generating triggering pulses as said wiper moves across said segments, said pulses being connected to actuate said switch means such that said switch means is in said first position when said wiper engages one of said segments and is in the the other of said positions when said wiper engages the other of said segments, said circuit means comprising a bistable multivibrator connected to said wiper and said segments such that it is in one of its states when one of said segments is engaged by said wiper and is in the other of its states when the other of said segments is engaged by said wiper.

3. Apparatus for controlling the position and movement of a structure which is movable along a path, comprising first and second fine channels, said fine channels including means responsive to the position of the structure for providing first and second fine feedback signals, comparator means for comparing the frequencies of two signals and providing an error signal indicative of the frequency difference, switch means responsive to the position of the structure for alternately connecting said first feedback signal and a first command signal to said comparator means and then said second feedback signal and a second command signal to said comparator means, said feedback signals having frequencies representative of the actual position of the structure and said command signals having frequencies representative of a desired position of the structure, and drive means responsive to said error signal for moving said structure along said path to said desired position, said switch means comprising four switches and actuator means responsive to the position of the structure for controlling actuation of said switches, two of said four switches being connected to receive and pass said first error signal and said first command signal to said comparator means when actuated and the other two of said switches being connected to receive and pass said second error signal and said second command signal to said comparator means when actuated, said actuator means alternately actuating said two switches and then said other two switches as said structure is moved along said path.

4. Apparatus as in claim 3, wherein a first curve showing the position-to-frequency format of said first feedback signal has a positive slope over the major portion of its variation, and a second curve showing the position-to-frequency format of said second feedback signal and said second command signal has a negative slope over the major portion of its variation, said comparator means having first and second input terminals, which receive said signals from said four switches, and said connections between said switches and said comparator means being such that said first feedback and command signals are respectively connected to said first and second input terminals, and said second feedback and command signals are respectively connected to said second and first input terminals.

5. Apparatus as in claim 4, wherein the frequencies of all of said feedback and command signals are in the same range, said positive and negative slopes of said curves thereby resulting in intersections of said curves at spaced positions along said path, and said actuator means being constructed to actuate said four switches at said spaced positions.

6. An apparatus for controlling the position and movement of a structure along a path, comprising drive means for moving the structure along the path, two fine control means each responsive to the distance between the actual position of the structure and a desired position and producing a signal of changing frequency indicative of such distance, each of said fine control means generating its signal in accordance with a predetermined change of frequency format with the formats of said two fine control means crossing each other at predetermined points of equal frequency, one of said two formats between every pair of adjacent points of crossing of said formats varying in a gradually increasing or a gradually decreasing manner without reaching a maximum or minimum crest, and switching means for alternately connecting one of said fine control means and then the other of said fine control means to said drive means, said drive means being energized by error signals derived from said changing frequency signals to move said structure along said path toward said desired position to thereby eliminate said error signals, and said switching means operating at each of said points of crossing to connect said drive means to the one of said fine control means which has a format without a crest before the next crossing in the direction of movement of the structure.

References Cited

UNITED STATES PATENTS

| | | | |
|---|---|---|---|
| 1,768,966 | 7/1930 | Tanner | 318—20.250 |
| 2,395,708 | 2/1946 | Alexandersson et al. | 318—20.250 |
| 2,588,213 | 3/1952 | Davis et al. | 318—20.270 |
| 2,978,620 | 1/1961 | Schlatter | 318—20.360 |
| 3,091,755 | 5/1963 | Sanner et al. | 318—20.250 |
| 3,109,128 | 10/1963 | Pruden et al. | 318—20.286 |
| 3,209,220 | 9/1965 | Joy | 318—20.360 |
| 3,254,283 | 5/1966 | Hunt | 318—20.798 |

ORIS L. RADER, *Primary Examiner.*

THOMAS E. LYNCH, *Assistant Examiner.*

U.S. Cl. X.R.

318—28, 448